United States Patent
Jiang et al.

(10) Patent No.: US 9,673,984 B2
(45) Date of Patent: *Jun. 6, 2017

(54) SESSION KEY CACHE TO MAINTAIN SESSION KEYS

(71) Applicant: Microsoft Technology Licensing, LLC, Redmond, WA (US)

(72) Inventors: Wei Jiang, Redmond, WA (US); Adam Back, Borden (CA); John D. Whited, Duvall, WA (US); Yordan I. Rouskov, Kirkland, WA (US); Ismail Cem Paya, Seattle, WA (US); Wei-QUiang Michael Guo, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/069,006

(22) Filed: Oct. 31, 2013

(65) Prior Publication Data

US 2014/0059354 A1 Feb. 27, 2014

Related U.S. Application Data

(63) Continuation of application No. 13/026,793, filed on Feb. 14, 2011, now Pat. No. 8,626,929, which is a
(Continued)

(51) Int. Cl.
*H04L 9/32* (2006.01)
*H04L 9/08* (2006.01)
(Continued)

(52) U.S. Cl.
CPC .......... *H04L 9/3247* (2013.01); *H04L 9/0825* (2013.01); *H04L 9/3242* (2013.01); *H04L 63/045* (2013.01); *G06F 21/6218* (2013.01)

(58) Field of Classification Search
CPC ............. H04L 9/0825; H04L 2463/062; H04L 67/142; G06F 21/6218
(Continued)

(56) References Cited

U.S. PATENT DOCUMENTS 5,917,911 A * 6/1999 Dabbish et al. .............. 380/286
6,125,185 A 9/2000 Boesch
(Continued)

OTHER PUBLICATIONS

Office action for U.S. Appl. No. 13/026,793 mailed on Oct. 26, 2012, Jiang et al., "Scalable Session Management", 10 pages.
(Continued)

*Primary Examiner* — Hadi Armouche
*Assistant Examiner* — Bryan Wright
(74) *Attorney, Agent, or Firm* — Lee & Hayes, PLLC

(57) ABSTRACT

Scalable session management is achieved by generating a cookie that includes an encrypted session key and encrypted cookie data. The cookie data is encrypted using the session key. The session key is then signed and encrypted using one or more public/private key pairs. The encrypted session key can be decrypted and verified using the same private/public key pair(s). Once verified, the decrypted session key can then be used to decrypt and verify the encrypted cookie data. A first server having the private/public key pair(s) may generate the cookie using a randomly generated session key. A second server having the same private/public key pair(s) may decrypt and verify the cookie even if the session key is not initially installed on the second server. A session key cache may be used to provide session key lookup to save public/private key operations on the servers.

21 Claims, 7 Drawing Sheets

Related U.S. Application Data continuation of application No. 11/084,051, filed on Mar. 18, 2005, now Pat. No. 7,890,634.

(51) Int. Cl.
*H04L 29/06* (2006.01)
*G06F 21/62* (2013.01)

(58) Field of Classification Search
USPC .......................................................... 713/176
See application file for complete search history.

(56) References Cited

U.S. PATENT DOCUMENTS

| | | | |
|---|---|---|---|
| 6,199,113 B1* | 3/2001 | Alegre ..................... G06F 21/31 709/219 |
| 6,609,198 B1* | 8/2003 | Wood ...................... G06F 21/31 713/155 |
| 6,804,777 B2* | 10/2004 | Hollis et al. .................. 713/170 |
| 6,938,085 B1 | 8/2005 | Belkin et al. |
| 6,985,953 B1* | 1/2006 | Sandhu et al. ................. 709/229 |
| 7,024,552 B1* | 4/2006 | Caswell ............... G06Q 20/367 380/258 |
| 7,213,145 B2* | 5/2007 | Sasmazel ...................... 713/153 |
| 7,346,775 B2 | 3/2008 | Gasparini et al. |
| 7,478,434 B1* | 1/2009 | Hinton ................ G06F 17/3089 726/27 |
| 7,890,634 B2* | 2/2011 | Jiang et al. .................... 709/227 |
| 8,626,929 B2* | 1/2014 | Jiang et al. .................... 709/227 |
| 2001/0054155 A1* | 12/2001 | Hagan ................. G06F 21/6254 713/193 |
| 2002/0010776 A1* | 1/2002 | Lerner ........................... 709/225 |
| 2002/0165912 A1 | 11/2002 | Wenocur et al. |
| 2002/0165971 A1* | 11/2002 | Baron ..................... H04L 63/08 709/228 |
| 2003/0021417 A1* | 1/2003 | Vasic et al. .................... 380/277 |
| 2003/0110266 A1* | 6/2003 | Rollins et al. ................ 709/227 |
| 2004/0039924 A1 | 2/2004 | Baldwin et al. |
| 2005/0027985 A1 | 2/2005 | Sprunk et al. |
| 2005/0050455 A1* | 3/2005 | Yee et al. ....................... 715/513 |
| 2005/0076103 A1* | 4/2005 | Hilf et al. ..................... 709/220 |
| 2005/0154795 A1* | 7/2005 | Kuz et al. ..................... 709/227 |
| 2005/0220095 A1 | 10/2005 | Narayanan et al. |
| 2006/0064463 A1* | 3/2006 | Chan .................... G06F 21/6218 709/206 |
| 2006/0101114 A1 | 5/2006 | Sandhu et al. |
| 2006/0143189 A1* | 6/2006 | Imaeda ................. G06F 21/335 |

OTHER PUBLICATIONS

Office Action for U.S. Appl. No. 13/026,793, mailed on Apr. 13, 2012, Wei Jiang, "Scalable Session Management", 15 pgs.

Office action for U.S. Appl. No. 13/026,793, mailed on Apr. 15, 2013, Jiang et al., "Scalable Session Management",9 pages.

* cited by examiner

SESSION KEY CACHE TO MAINTAIN SESSION KEYS

RELATED APPLICATION

This application is a continuation of, and claims priority to, U.S. patent application Ser. No. 13/026,793 to Jiang, et al., entitled, "Scalable Session Management," filed on Feb. 14, 2011, which is a continuation of, and claims priority to U.S. patent application Ser. No. 11/084,051 to Jiang, et al., entitled, "Scalable Session Management," filed on Mar. 18, 2005 and issued under U.S. Pat. No. 7,890,634 on Feb. 15, 2011, both of which are incorporated herein by reference.

TECHNICAL FIELD

This invention relates to session management, and more specifically, to scalable session management.

BACKGROUND

When a user browses to a website, the website can return data, known as a cookie, that is stored on the user's computer, and then sent back to the server when the user later browses to the same website. The cookie can be used by the website to establish a state associated with the user. For example, with a website through which a user can make purchases, a cookie may be used to maintain a list of items that are in the user's shopping cart. For example, a user may visit the website, add things to their shopping cart, and leave the website. When the user returns to the website, the previously added items are still in the user's shopping cart, based on data stored in a cookie. Because cookies may contain sensitive and/or personal data (e.g., data for providing access to a bank account), it is important that cookies be protected. Cookies are typically signed and/or encrypted to protect the data. Furthermore, to increase security, keys that are used to sign and/or encrypt cookies should be securely stored and frequently changed.

Many websites are implemented using a server farm environment, in which the load is balanced across multiple, independent server systems. When a user accesses a particular website that is available via the server farm, the user may actually be accessing any of the server systems that are part of the server farm. Accordingly, for cookies to be effective, each server system should be able to receive and use a cookie from a user, even if the server that receives the cookie is not the server that generated the cookie. To accomplish this, secure, frequently changed keys that can be used to decrypt and/or verify received cookies should be available across multiple, independent server systems.

Accordingly, a need exists for a technique for automatically making symmetric keys accessible to multiple, independent server systems.

SUMMARY

Scalable session management is described herein.

The techniques described herein enable multiple severs with the same private/public key pairs to derive the same symmetric keys. Public key management, which is relatively easy to manage across multiple servers using, for example, widespread hardware support, is combined with the efficiency of symmetric cryptography, enabling an arbitrary combination of signature and encryption algorithms.

In the described exemplary implementation, one or more private/public key pairs are installed on multiple servers in a server farm. When a cookie is generated by one of the servers for a particular client, the cookie data is encrypted using a session key, which may be randomly generated. The session key is then signed and encrypted using one or more of the private/public key pairs and transmitted to the client along with the encrypted cookie data. When the same client establishes a connection with any of the servers in the server farm and sends the cookie, the server uses the private/public key pair(s) to decrypt and verify the session key that was included with the cookie. Once verified, the session key is then used to decrypt the cookie data.

In an exemplary implementation, the first server also applies a message authentication code (MAC) to the cookie data and the session key to generate an authentication tag that can later be used to authenticate the decrypted cookie data.

A session key may also have an associated expiration date/time, after which the any cookie generated using the session key is no longer valid. Session keys may be cached by one or more servers in the server farm, and expired session keys may be purged from the cache periodically. For example, an expired session key may be purged from the cache when a cookie including the expired session key is received. Alternatively, the cache may be purged of expired session keys iteratively according to a configured time schedule, after a configured number of cookies have been received, and/or after a configured number of session keys have been added to the cache.

BRIEF DESCRIPTION OF THE DRAWINGS

The same numbers are used throughout the drawings to reference like features and components.

DETAILED DESCRIPTION

The following discussion is directed to scalable session management. In many client-server systems, data associated with a particular session may be generated by the server and stored on the client. This data is commonly referred to as a "cookie". The cookie may later be sent back to the server, for example, to enable the state of the previous session to be recreated. Because cookies may include sensitive data (e.g., a cookie may be associated with a user's bank account information), it is important that the confidentiality and integrity of cookies be maintained. Cookie confidentiality ensures that the data stored in a cookie cannot be easily determined, while cookie integrity ensures that the data stored in a cookie cannot be tampered with. In the described exemplary implementation, confidentiality is achieved by encrypting the data to be stored in the cookie; integrity is achieved by signing a key used to encrypt the cookie data and applying a message authentication code to the cookie data. In this way, the cookie data and the encryption key can both be verified.

To enable multiple, independent server systems to be able to decrypt and/or verify received data (e.g., a cookie), an encrypted symmetric key is carried with an encrypted session token. When a server receives an encrypted token with an encrypted symmetric key, the server decrypts the encrypted symmetric key, which can then be used to decrypt the encrypted token.

While features of scalable session management can be implemented in any number of different computing environments, they are described in the context of the following exemplary implementations.

Figure 1:
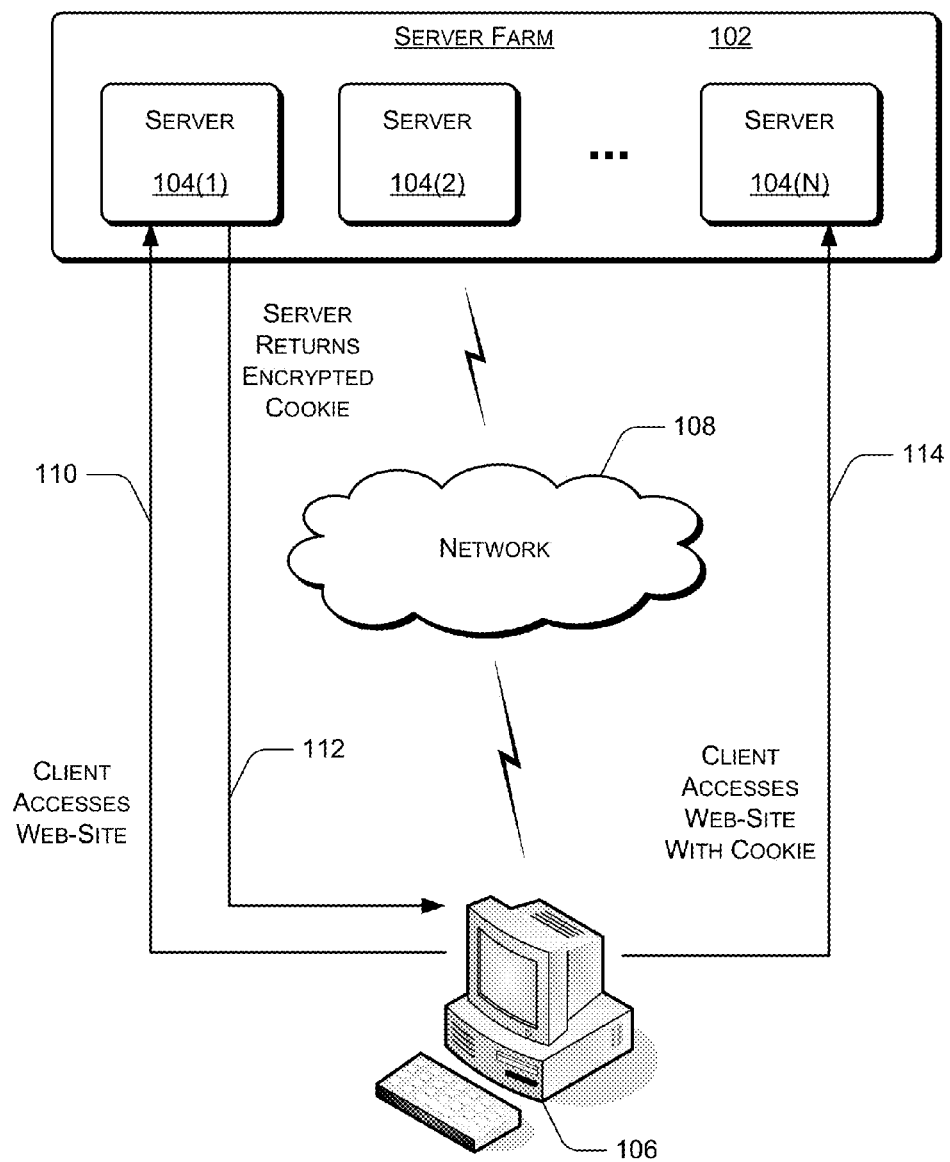
FIG. 1 is a pictorial diagram illustrating an exemplary network environment in which scalable session management may be implemented.

FIG. 1 illustrates an exemplary network environment in which scalable session management may be implemented. In the illustrated example, server farm 102 includes multiple independent servers 104(1), 104(2), . . . , 104(N). Client system 106 communicates with server farm 102 over a network 108, such as the Internet. For example, client system 106 may utilize a web browser to access a website provided by server farm 102. In the illustrated example, client system 106 accesses the website via server 104(1), as represented by arrow 110. Server 104(1) returns an encrypted cookie, as represented by arrow 112. At a later time, client system 106 accesses the website again, but this time via server 104(N). As represented by arrow 114, the cookie that was generated by server 104(1) is transmitted to server 104(N), which utilizes the data in the cookie, for example, to re-establish a website state that the user experienced in a previous interaction with the website. A network server 104 and/or client system 106 may be implemented as any form of computing or electronic device with any number and combination of differing components as described below with reference to the exemplary computing environment 700 shown in FIG. 7.

Figure 2:
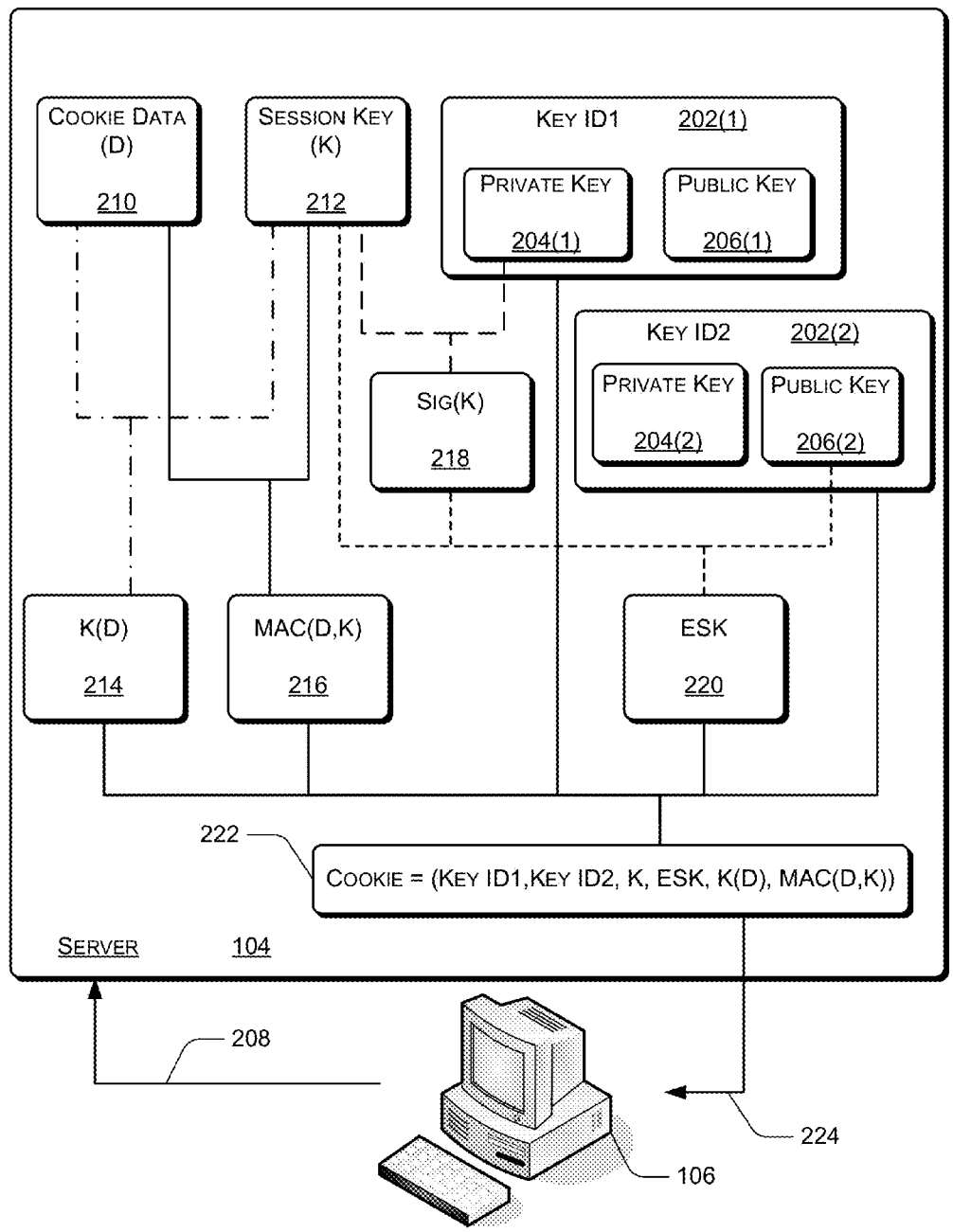
FIG. 2 is a block diagram illustrating exemplary generation of a session cookie.

FIG. 2 illustrates exemplary processing that may be performed by a server 104 to generate a cookie. Server 104 maintains private/public key pairs, two of which are identified in FIG. 2 by key ID1 202(1) and key ID2 202(2). In an exemplary implementation, server 104 may maintain one or more private/public key pairs that may be used, for example, to encrypt, decrypt, sign, and/or verify different types of data. The illustrated private/public key pairs 202(1) and 202(2) include private key 204(1), public key 206 (1), private key 204(2), and public key 206(2).

When client system 106 contacts server 104, as represented by arrow 208, server 104 generates cookie data (D) 210. Cookie data (D) 210 includes, for example, state information associated with a session between server 104 and client system 106. The state information may include personal settings, shopping cart contents, and the like. Server 104 also generates or identifies a session key (K) 212 that can be used as an encryption key. In an exemplary implementation, session key (K) 212 is a randomly generated value that may expire after a configurable period of time. After one session key expires, server 104 may randomly generate a new session key.

Cookie data (D) 210 is then encrypted using session key (K) 212 to generate encrypted cookie data K(D) 214. A message authentication code (MAC) is applied to cookie data (D) and session key (K) to generate an authentication tag MAC(D,K) 216. Any type of message authentication code may be used to generate the authentication tag, one example being a hash function-based message authentication code (HMAC).

In an alternate implementation, the authentication tag MAC(D,K) 216 may be generated prior to encrypting the cookie data (D). The authentication tag and the cookie data may then be encrypted together using the session key (K), to generated encrypted data K(D, MAC(D,K)).

In another alternate implementation, the authentication tag may be generated using a MAC key that differs from the session key (K). Although the described implementation uses the session key(K) when generating the authentication tag, it is common cryptographic practice to use different keys for different purposes. As one example, a new key to be used for generating the authentication tag may be derived from the session key(K) according to any number of known key derivation techniques.

Server 104 signs session key (K) 212 with private key 204(1) to generate Sig(K) 218. Session key (K) 212 is then combined with Sig(K) 218 and encrypted using public key 206(2) to generate encrypted, signed key ESK 220.

A cookie 222 is then generated by combining key ID1 202(1), key ID2 202(2), ESK 220, K(D) 214, and MAC(D, K) 216. Cookie 222 is then transmitted to client system 106, as represented by arrow 224. If the authentication tag is encrypted with the cookie data, the cookie may include K(D, MAC(D,K)), which could later be decrypted to reveal cookie data (D) 210 and authentication tag MAC(D,K) 216.

Two private/public key pairs may be used due to the size of the data that is being signed and/or encrypted. For example, the block size needed for encryption may be larger than the block size needed for signing. However, in an alternate implementation, encrypted, signed key ESK 220 may be encrypted using public key 206(1), resulting in a cookie that includes key ID1, but does not necessarily include key ID2.

Figure 3:
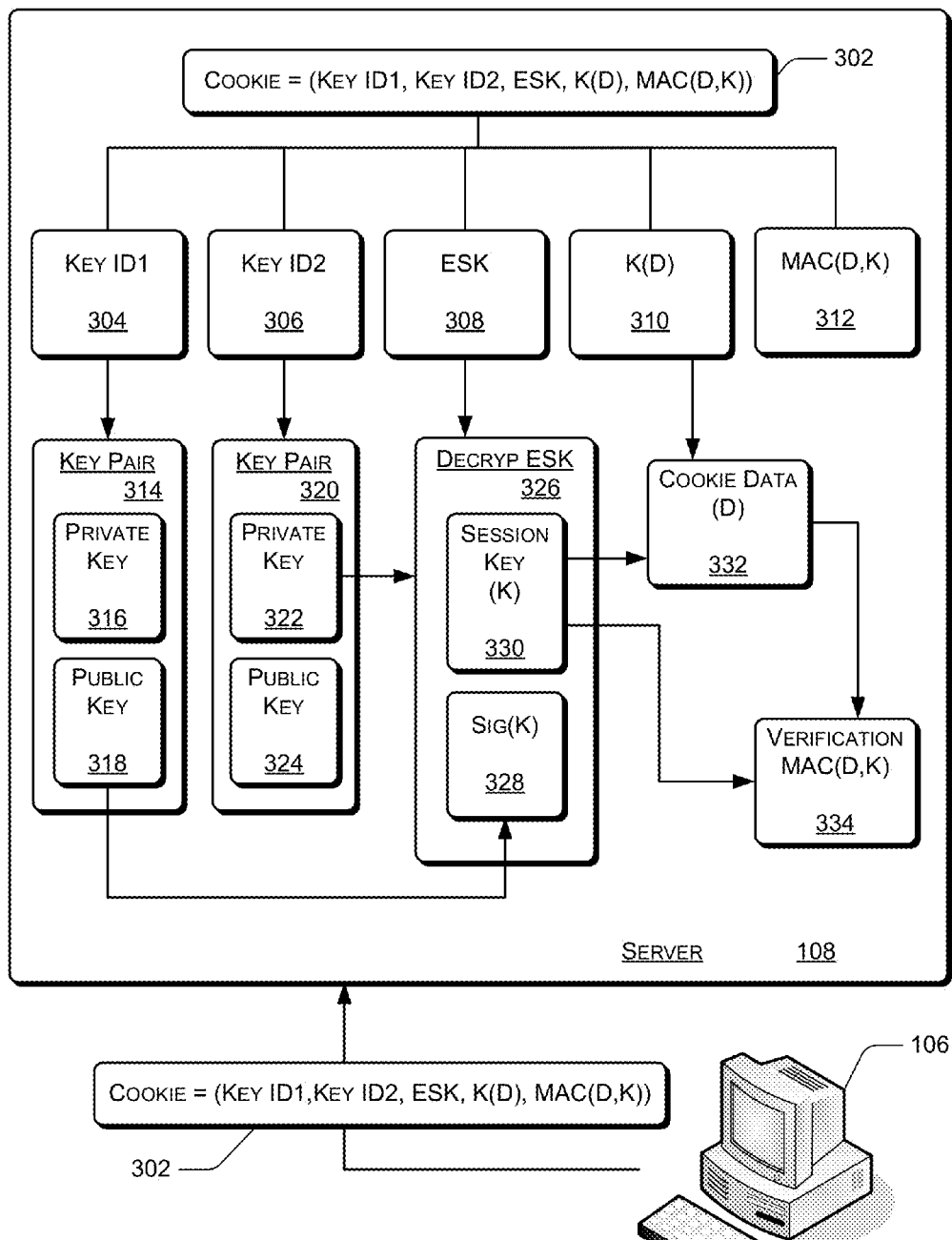
FIG. 3 is a block diagram illustrating decryption and verification of a received session cookie.

FIG. 3 illustrates exemplary processing that may be performed by a server 104 to decrypt and verify a received cookie. When server 104 receives a cookie 302 from a client system 106, server 104 parses the cookie 302 into a key ID1 304, key ID2 306, an encrypted signed key (ESK) 308, encrypted data K(D) 310, and authentication tag MAC(D,K) 312.

Key ID1 304 is used to lookup a private/public key pair 314 that includes a private key 316 and a public key 318. Key ID2 306 is used to lookup a private/public key pair 320 that includes a private key 322 and a public key 324. Private key 322 is then used to decrypt ESK 308, resulting in decrypted ESK 326, which includes signed key Sig(K) 328 and session key (K) 330. To verify that the session key in the cookie was not tampered with, Sig(K) is verified using public key 318. If the verification failed, indicating that Sig(K) is not a valid signature of session key (K) using private key 316, then the cookie is assumed to be invalid.

The decrypted and verified session key (K) 330 is then used to decrypt K(D) 310 to reveal cookie data (D) 332. As described above with reference to FIG. 2, in an alternate implementation, the cookie data and the authentication tag may have been encrypted together, in which case, the cookie may be parsed into a key ID1 304, key ID2 306, an encrypted signed key (ESK) 308, and encrypted data and authentication tag K(D, MAC(D,K)). The encrypted data and authentication tag K(D, MAC(D,K)) can then be decrypted using the decrypted and verified session key (K) 330 to identify cookie data (D) 332 and authentication tag MAC(D,K) 312.

A message authentication code (MAC) is then applied to cookie data (D) 332 and session key (K) 330 to generate verification MAC(D,K) 334. Verification MAC(D,K) 334 is then compared to MAC(D,K) 312 to verify that the cookie data (D) 332 is not corrupt.

If verifications of Sig(K) MAC(D,K) are successful, then the cookie data is successfully decrypted and verified and can be used to customize the session between server 104 and client system 106.

In an exemplary implementation, session key (K) 330 may include an expiration date/time. If the received session key has expired, then the server does not use the cookie, but rather establishes a connection with client system 106 that is not based on a state of a previous connection.

Furthermore, as described above with reference to FIG. 2, in an alternate implementation, the received cookie may include only one key ID, and the same private/public key pair may be used for decryption and verification of the session key and cookie data.

Figure 4:
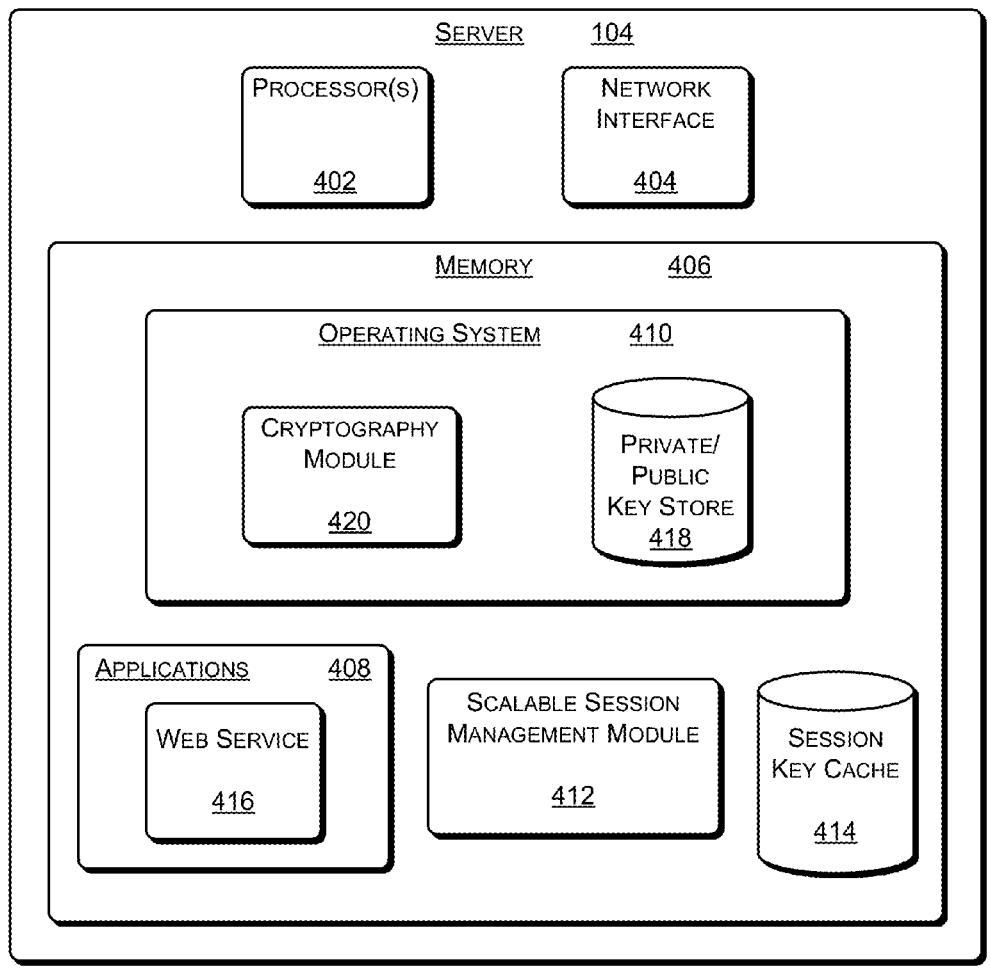
FIG. 4 is a block diagram of selected components of an exemplary server configured to enable scalable session management.

FIG. 4 illustrates select components of an exemplary server 104 configured to enable scalable session management as described herein. Server 104 may be implemented as any form of computing or electronic device with any number and combination of differing components as described below with reference to the exemplary computing environment 700 shown in FIG. 7.

Server 104 includes one or more processors 402, network interface 404, and memory 406. Network interface 404 enables server 104 to send and/or receive data over a network. One or more applications 408, an operating system 410, scalable session management module 412, and session key cache 414 are stored in memory 406 and executed on processor(s) 402. Application(s) 408 may include, for example, a web service 416 that enables user interaction with a website.

Operating system 410 includes, among other components, a private/public key store 418 and cryptography module 420. Private/public key store 418 is configured to maintain one or more private/public key pairs, each identified by a unique key ID. Cryptography module 420 is configured to perform various cryptographic functions, which may include, but are not limited to, private/public key encryption and decryption, private/public key signing and verifying, random value generation, symmetric key encryption and decryption, and authentication tag generation via a message authentication code.

Scalable session management module 412 is configured to generate encrypted cookies and to decrypt and verify received cookies. Session key cache 414 is configured to maintain one or more session keys and an associated encrypted signed key (ESK). Session key cache 414 may also be configured to maintain an expiration date/time associated with a particular session key. In such an implementation, expired session keys may be removed from the session key cache 414 using any number of techniques. For example, if a request is received that includes an expired key, the key may then be removed from the cache. In another implementation, the cache may be purged of expired keys iteratively, after a configurable number of requests are received. In yet another implementation, the cache may be purged of expired keys iteratively, after a configurable number of sessions keys have been added to the cache.

Methods for scalable session management may be described in the general context of computer executable instructions. Generally, computer executable instructions include routines, programs, objects, components, data structures, procedures, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 5:
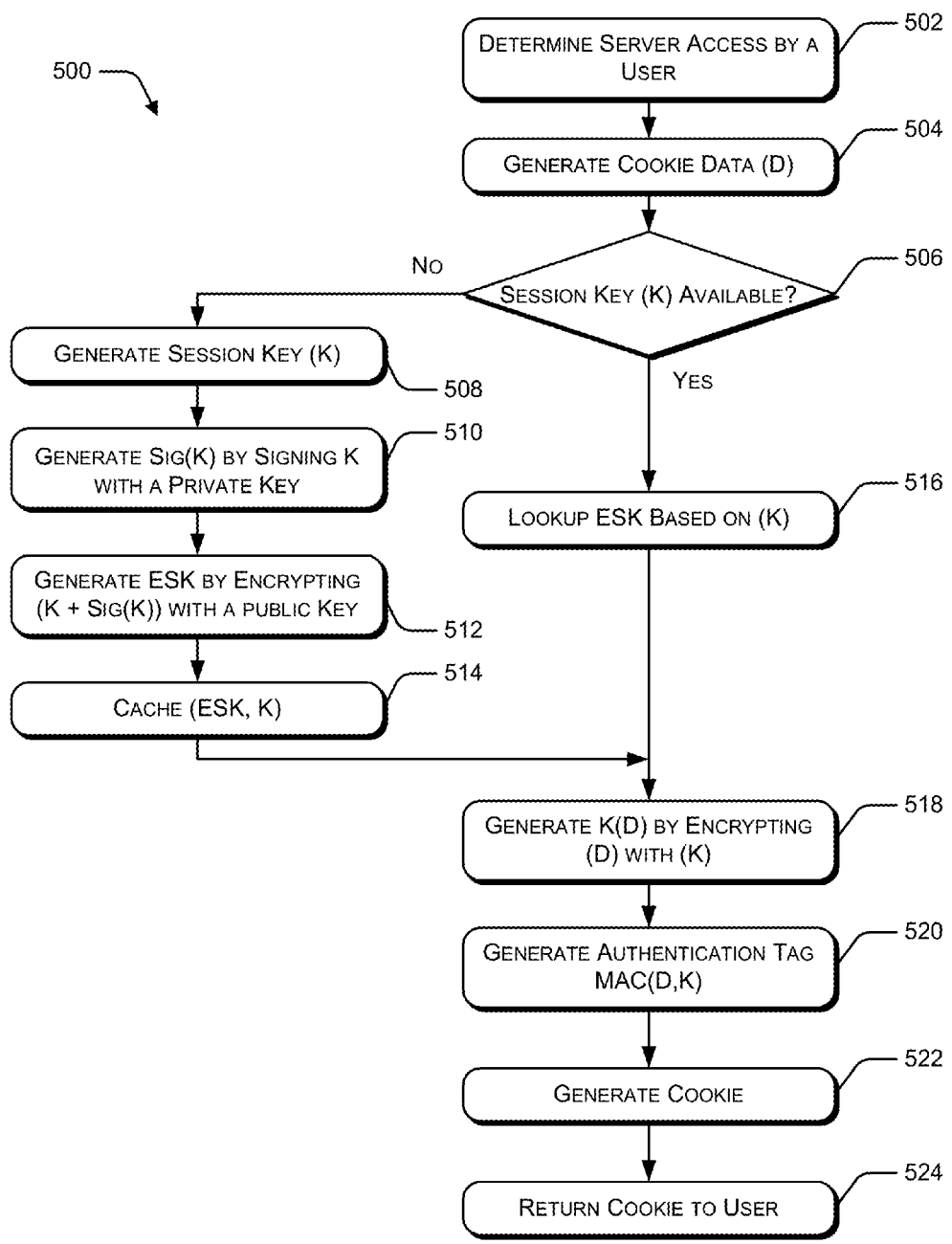
FIG. 5 is a flow diagram of an exemplary method for generating an encrypted session cookie.
Figure 6:
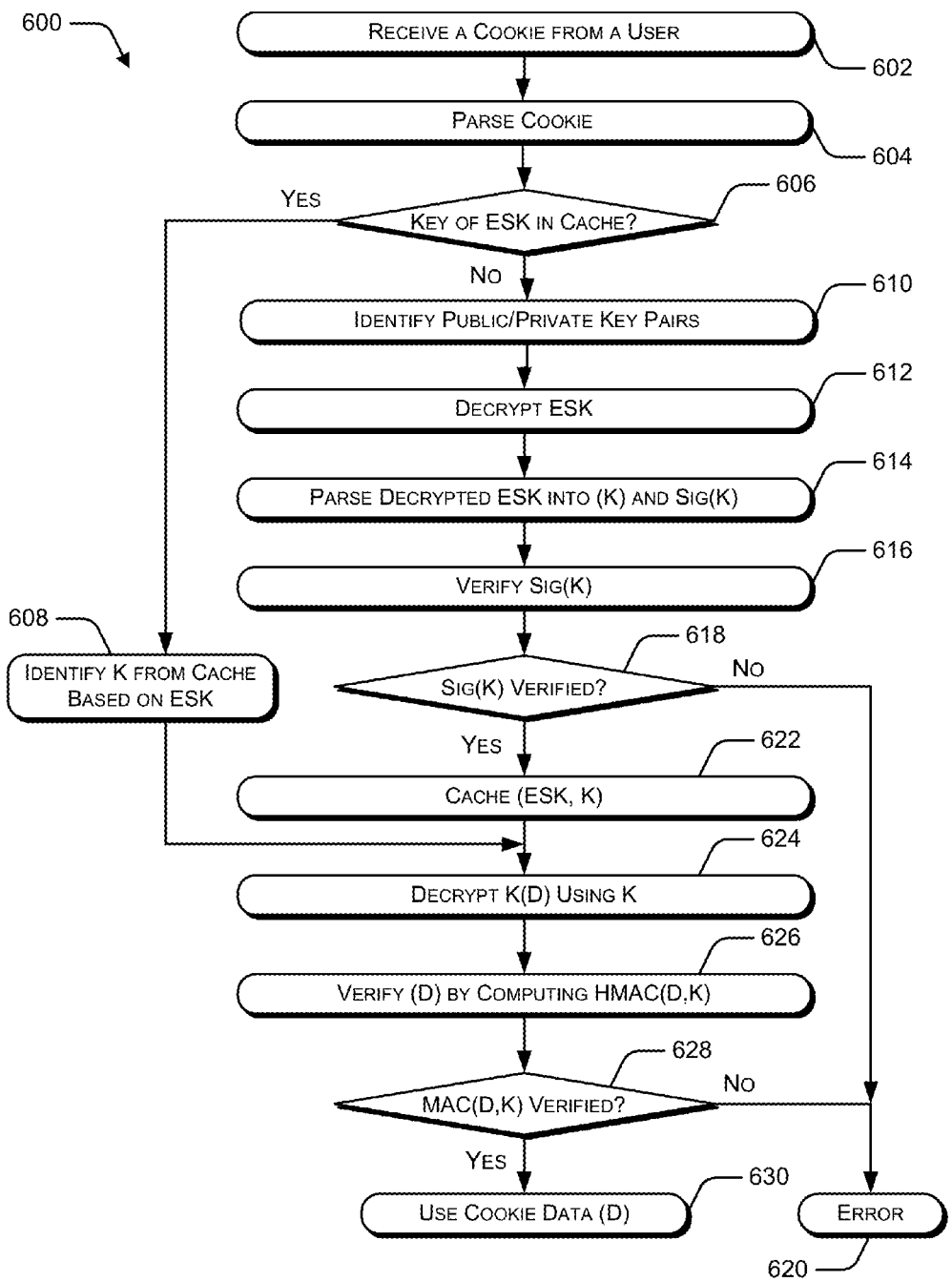
FIG. 6 is a flow diagram of an exemplary method for decrypting and verifying a received cookie.

FIGS. 5 and 6 illustrate exemplary methods for implementing scalable session management. The methods illustrated in FIGS. 5 and 6 are specific examples of scalable session management, and are not to be construed as limitations. Furthermore, it is recognized that various embodiments may implement any combination of the methods illustrated in FIGS. 5 and 6 or any combination of portions of the methods illustrated in FIGS. 5 and 6.

FIG. 5 illustrates an exemplary method 500 for generating an encrypted data cookie. The order in which the method is described is not intended to be construed as a limitation, and any number of the described method blocks can be combined in any order to implement the method. Furthermore, the method can be implemented in any suitable hardware, software, firmware, or combination thereof.

At block 502, a server determines that a user has accessed the server. For example, referring to FIG. 4, a user may have browsed to a website hosted by the server 104 and launched web service 416.

At block 504, the server generates cookie data (D) associated with the current session. For example, web service 416 may generate data that represents the user's shopping cart contents on a web commerce website.

At block 506, the server determines whether or not a session key (K) is available. For example, one or more session keys may be maintained in session key cache 414. If a valid session key is available in session key cache 414 (the "Yes" branch from block 506), then at block 516, scalable session management module 412 identifies a valid session key (K) and associated encrypted signed key (ESK) (e.g., by pulling a valid record from session key cache 414). Processing then continues as described below with reference to block 518.

On the other hand, if a valid session key is not currently available (the "No" branch from block 506), then at block 508, server 104 generates a new session key (K). For example, scalable session management module 412 may call a random value generator component of cryptography module 420 to obtain a random value to be used as a session key (K).

At block 510, the server uses a private key to sign session key (K), generating a new value Sig(K). For example, scalable session management module 412 may call a private key signature component of cryptography module 420, specifying the session key (K) and a key ID (e.g., Key ID1 202(1), as illustrated in FIG. 2) associated with a private/public key pair maintained in public/private key store 418. Cryptography module 420 then uses the private key associated with the specified key ID to sign the session key (K), and returns the result Sig(K).

At block 512, the server generates an encrypted signed key (ESK) by using a public key to encrypt a combination of (K) and Sig(K). For example, scalable session management module 412 may call a public key encryption component of cryptography module 420, specifying the session key (K), the signed session key Sig(K), and a key ID (e.g., Key ID2 202(2), as illustrated in FIG. 2) associated with a public/private key pair maintained in public/private key store 418. Cryptograhpy module 420 then uses the public key associated with the specified key ID (e.g., Key ID2) to encrypt (K+Sig(K)), and returns the result ESK. In an alternate implementation, the same private/public key pair may be specified for signing the session key (block 510) and encrypting the signed session key (block 512).

At block 514, the server caches session key (K) and encrypted signed key ESK. For example, scalable session management module 412 may add (K) and the associated ESK to session key cache 414.

At block 518, the server encrypts cookie data (D) using session key (K). For example, scalable session management module 412 may call a symmetric key encryption component of cryptography module 420, which returns encrypted cookie data K(D).

At block 520, the server generates an authentication tag MAC(D,K). For example, scalable session management module 412 may call cryptography module 420, specifying cookie data (D) and session key (K). Cryptography module 420 then applies a message authentication code to cookie data (D) and session key (K), and returns authentication tag MAC(D,K).

At block 522, the server generates a cookie. For example, scalable session management module 412 combines key ID1, key ID2, ESK, K(D), and MAC(D,K). In an exemplary implementation, the generated cookie may have the format: (Key ID1, Key ID2, ESK, K(D), MAC(D,K)). In an alternate implementation in which a single private/public key pair is used to sign and encrypt the session key and the cookie data, the generated cookie may have the format: (Key ID, ESK, K(D), MAC(D,K)).

In another alternate implementation, authentication tag MAC(D,K) may be generated (as described above with reference to block 520) prior to encryption of the cookie data (D). The cookie data and the authentication tag may then be encrypted together using the session key (K), rather than the cookie data being encrypted alone, as described above with reference to block 518.

At block 524, the server returns the generated cookie to the user. For example, web service 416 may transmit the generated cookie over a network to a client system through which a user accessed the web service.

FIG. 6 illustrates an exemplary method 600 for decrypting and verifying a received cookie. The order in which the method is described is not intended to be construed as a limitation, and any number of the described method blocks can be combined in any order to implement the method. Furthermore, the method can be implemented in any suitable hardware, software, firmware, or combination thereof.

At block 602, a server receives a cookie from a user. For example, a user may access a web service 416 from which the user previously received a cookie.

At block 604, the server parses the cookie into key ID1, key ID2, encrypted signed key (ESK), encrypted cookie data K(D) and authentication tag MAC(D,K). For example, scalable session management module 412 may receive the cookie from web service 416 and parse the cookie.

At block 606, the server determines whether or not the ESK is currently cached. For example, scalable session management module 412 performs a lookup in session key cache 414 based on the ESK value that was parsed from the cookie. In an exemplary implementation, the ESK value may be found in the cache if the server that received the cookie is the same server that generated the cookie (see block 514 of FIG. 5) or if the server that received the cookie has previously received another cookie that was encrypted using the same session key.

If the ESK is found in the cache (the "Yes" branch from block 606), then at block 608, the server identifies a session key (K) from the cache based on the ESK. For example, scalable session management module 412 queries session key cache 414 using the ESK to determine the session key (K). Processing then continues as described below with reference to block 624.

If the ESK is not found in the cache (the "No" branch from block 606), then at block 610, the server identifies two public/private key pairs based on the key ID1 and key ID2 extracted from the cookie. For example, scalable session management module may query private/public key store 418 using key ID1 and key ID2 to identify the private/public key pairs.

At block 612, the server decrypts the ESK using the private key of the identified private/public key pair associated with key ID2. For example, scalable session management module 412 may call a private key decryption component of cryptography module 420, specifying ESK and the private key (or key ID2, which can be used to lookup the private key). Cryptography module 420 uses the private key to decrypt the ESK, returning the result to scalable session management module 412.

At block 614, the server (e.g., scalable session management module 412) parses the decrypted ESK to identify session key (K) and signed session key Sig(K).

At block 616, the server verifies Sig(K) using the public key associated with key ID1 found in the cookie. For example, scalable session management module 412 calls a signature component of cryptography module 420, specifying session key (K), signature of the session key (Sign(K)) (both extracted from the decrypted ESK as described above with reference to blocks 612 and 614) and the public key (or key ID1, which can be used to lookup the public key in private/public key store 418). Cryptography module 420 verifies the signature using the specified public key.

At block 618, the server determines whether or not the signed session key was successfully verified. If the signature is invalid (the "No" branch from block 618), then at block 620, scalable session management module generates an error message that directs web service 416 to not accept the cookie.

On the other hand, if the signature is valid (the "Yes" branch from block 618), then at block 622, scalable session management module caches ESK and (K) in session key cache 414.

At block 624, the server decrypts K(D) using session key (K). For example, scalable session management module 412 may call a symmetric key decryption component of cryptography module 420, specifying K(D) and (K). Cryptography module 420 decrypts K(D) using K as the key, and returns cookie data (D) to scalable session management module 412. In an alternate implementation in which the cookie data D and the authentication tag MAC(D,K) were encrypted together, the session key is used to decrypt the combination of the cookie data and the authentication tag. The result is then parsed to identify the cookie data (D) and the authentication tag MAC(D,K).

At block 626, the server verifies cookie data (D) by generating a authentication tag verification MAC(D,K). For example, scalable session management module 412 may call cryptography module 420, specifying cookie data (D) and session key (K). Cryptography module 420 then applies a message authentication code to cookie data (D) and session key (K), and returns authentication tag verification MAC (D,K).

At block 628, the server determines whether or not the values of MAC(D,K) and verified MAC(D,K) match. If the values do not match (the "No" branch from block 628), then at block 620, scalable session management module 412 generates an error message that directs web service 416 to not accept the cookie.

On the other hand, if the values do match (the "Yes" branch from block 628), then at block 630, scalable session management module 412 sends cookie data (D) to web service 416, indicating that the cookie data has been decrypted and verified.

In an alternate implementation, the received cookie may include only one key ID, rather than key ID1 and key ID2. In such an implementation, the same private/public key pair is used to decrypt and verify the session key and the cookie data.

Figure 7:
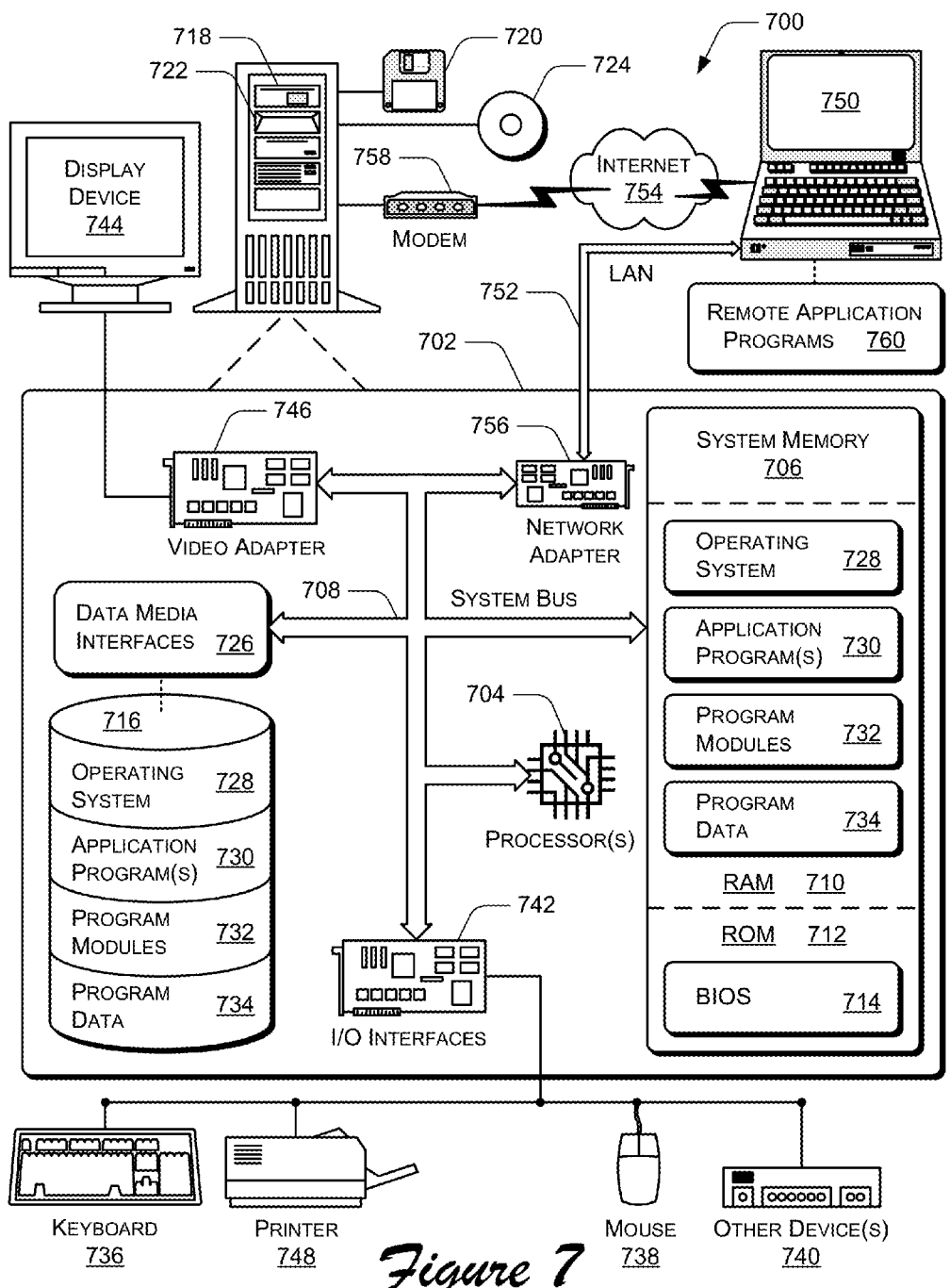
FIG. 7 is a pictorial/block diagram of exemplary computing systems, devices, and components in an environment in which scalable session management may be implemented.

FIG. 7 illustrates an exemplary computing environment 700 within which scalable session management systems and methods, as well as the computing, network, and system architectures described herein, can be either fully or partially implemented. Exemplary computing environment 700 is only one example of a computing system and is not intended to suggest any limitation as to the scope of use or functionality of the architectures. Neither should the computing environment 700 be interpreted as having any dependency or requirement relating to any one or combination of components illustrated in the exemplary computing environment 700.

The computer and network architectures in computing environment 700 can be implemented with numerous other general purpose or special purpose computing system environments or configurations. Examples of well known computing systems, environments, and/or configurations that may be suitable for use include, but are not limited to, personal computers, server computers, client devices, handheld or laptop devices, microprocessor-based systems, multiprocessor systems, set top boxes, programmable consumer electronics, network PCs, minicomputers, mainframe computers, gaming consoles, distributed computing environments that include any of the above systems or devices, and the like.

The computing environment 700 includes a general-purpose computing system in the form of a computing device 702. The components of computing device 702 can include, but are not limited to, one or more processors 704 (e.g., any of microprocessors, controllers, and the like), a system memory 706, and a system bus 708 that couples the various system components. The one or more processors 704 process various computer executable instructions to control the operation of computing device 702 and to communicate with other electronic and computing devices. The system bus 708 represents any number of several types of bus structures, including a memory bus or memory controller, a peripheral bus, an accelerated graphics port, and a processor or local bus using any of a variety of bus architectures.

Computing environment 700 includes a variety of computer readable media which can be any media that is accessible by computing device 702 and includes both volatile and non-volatile media, removable and non-removable media. The system memory 706 includes computer readable media in the form of volatile memory, such as random access memory (RAM) 710, and/or non-volatile memory, such as read only memory (ROM) 712. A basic input/output system (BIOS) 714 maintains the basic routines that facilitate information transfer between components within computing device 702, such as during start-up, and is stored in ROM 712. RAM 710 typically contains data and/or program modules that are immediately accessible to and/or presently operated on by one or more of the processors 704.

Computing device 702 may include other removable/non-removable, volatile/non-volatile computer storage media. By way of example, a hard disk drive 716 reads from and writes to a non-removable, non-volatile magnetic media (not shown), a magnetic disk drive 718 reads from and writes to a removable, non-volatile magnetic disk 720 (e.g., a "floppy disk"), and an optical disk drive 722 reads from and/or writes to a removable, non-volatile optical disk 724 such as a CD-ROM, digital versatile disk (DVD), or any other type of optical media. In this example, the hard disk drive 716, magnetic disk drive 718, and optical disk drive 722 are each connected to the system bus 708 by one or more data media interfaces 726. The disk drives and associated computer readable media provide non-volatile storage of computer readable instructions, data structures, program modules, and other data for computing device 702.

Any number of program modules can be stored on RAM 710, ROM 712, hard disk 716, magnetic disk 720, and/or optical disk 724, including by way of example, an operating system 728, one or more application programs 730, other program modules 732, and program data 734. Each of such operating system 728, application program(s) 730, other program modules 732, program data 734, or any combination thereof, may include one or more embodiments of the systems and methods described herein.

Computing device 702 can include a variety of computer readable media identified as communication media. Communication media typically embodies computer readable instructions, data structures, program modules, or other data in a modulated data signal such as a carrier wave or other transport mechanism and includes any information delivery media. The term "modulated data signal" refers to a signal that has one or more of its characteristics set or changed in such a manner as to encode information in the signal. By way of example and not limitation, communication media includes wired media such as a wired network or direct-wired connection, and wireless media such as acoustic, RF, infrared, other wireless media, and/or any combination thereof.

A user can interface with computing device 702 via any number of different input devices such as a keyboard 736 and pointing device 738 (e.g., a "mouse"). Other input devices 740 (not shown specifically) may include a microphone, joystick, game pad, controller, satellite dish, serial port, scanner, and/or the like. These and other input devices are connected to the processors 704 via input/output interfaces 742 that are coupled to the system bus 708, but may be connected by other interface and bus structures, such as a parallel port, game port, and/or a universal serial bus (USB).

A display device 744 (or other type of monitor) can be connected to the system bus 708 via an interface, such as a video adapter 746. In addition to the display device 744, other output peripheral devices can include components such as speakers (not shown) and a printer 748 which can be connected to computing device 702 via the input/output interfaces 742.

Computing device 702 can operate in a networked environment using logical connections to one or more remote computers, such as remote computing device 750. By way of example, remote computing device 750 can be a personal computer, portable computer, a server, a router, a network computer, a peer device or other common network node, and the like. The remote computing device 750 is illustrated as a portable computer that can include any number and combination of the different components, elements, and features described herein relative to computing device 702.

Logical connections between computing device 702 and the remote computing device 750 are depicted as a local area network (LAN) 752 and a general wide area network (WAN) 754. Such networking environments are commonplace in offices, enterprise-wide computer networks, intranets, and the Internet. When implemented in a LAN networking environment, the computing device 702 is connected to a local network 752 via a network interface or adapter 756. When implemented in a WAN networking environment, the computing device 702 typically includes a modem 758 or other means for establishing communications over the wide area network 754. The modem 758 can be internal or external to computing device 702, and can be connected to the system bus 708 via the input/output interfaces 742 or other appropriate mechanisms. The illustrated network connections are merely exemplary and other means of establishing communication link(s) between the computing devices 702 and 750 can be utilized.

In a networked environment, such as that illustrated with computing environment 700, program modules depicted relative to the computing device 702, or portions thereof, may be stored in a remote memory storage device. By way of example, remote application programs 760 are maintained with a memory device of remote computing device 750. For purposes of illustration, application programs and other executable program components, such as operating system 728, are illustrated herein as discrete blocks, although it is recognized that such programs and components reside at various times in different storage components of the computing device 702, and are executed by the one or more processors 704 of the computing device 702.

Although embodiments of scalable session management have been described in language specific to structural features and/or methods, it is to be understood that the subject of the appended claims is not necessarily limited to the specific features or methods described. Rather, the specific features and methods are disclosed as exemplary implementations of scalable session management.

The invention claimed is:

1. A method comprising:
   signing a session key using a private/public key pair to generate a signed key;
   maintaining, in a session key cache, the session key in association with the signed key;
   determining an expiration time for the session key;
   receiving, at a time after the expiration time for the session key, a cookie generated using the session key, the cookie including at least encrypted cookie data, the signed key, and an encrypted authentication tag, the encrypted authentication tag including a message authentication code associated with the cookie data and the session key, and the encrypted authentication tag encrypted using the session key;
   determining, based at least in part on the receiving the cookie generated using the session key, that the session key associated with the cookie has expired based at least in part the expiration time for the session key;
   removing the session key from the session key cache in response to determining that the session key associated with the cookie has expired;
   determining that the cookie is invalid based at least in part on the determining that the session key associated with the cookie has expired; and
   establishing a new client session that is not based on a previous client session associated with the cookie in response to determining that the session key associated with the cookie has expired.

2. The method of claim 1, further comprising:
   parsing the cookie to identify a key identification; and
   searching the session key cache to identify the session key based at least in part on the key identification.

3. The method of claim 1, further comprising:
   parsing the cookie to identify an encrypted signed key; and
   searching the session key cache to identify the session key based at least in part on the encrypted signed key.

4. The method of claim 1, further comprising removing the session key from the session key cache based at least in part on a removal time schedule.

5. The method of claim 1, further comprising removing the session key from the session key cache based at least in part on a determination that a number of session keys in the session key cache exceeds a predetermined number of session keys.

6. One or more computer memories storing instructions that, when executed by one or more processors, configure the one or more or processors to perform operations comprising:
   signing a session key using a private/public key pair to generate a signed key;
   maintaining, in a session key cache, the session key in association with the signed key;
   determining an expiration time for the session key;
   receiving, at a time after the expiration time for the session key, a cookie generated using the session key, the cookie including at least encrypted cookie data, the signed key, and an encrypted authentication tag, the encrypted authentication tag including a message authentication code associated with the cookie data and the session key, and the encrypted authentication tag encrypted using the session key;
   determining, based at least in part on the receiving the cookie generated using the session key, that the session key associated with the cookie has expired;
   removing the session key from the session key cache in response to determining that the session key associated with the cookie has expired based at least in part the expiration time for the session key;
   determining that the cookie is invalid based at least in part on the determining that the session key associated with the cookie has expired; and
   establishing a new client session that is not based on a previous client session associated with the cookie in response to determining that the session key associated with the cookie has expired.

7. The one or more computer memories of claim 6, wherein the operations further comprise:
   parsing the cookie to identify a key identification; and
   searching the session key cache to identify the session key based at least in part on the key identification.

8. The one or more computer memories of claim 6, wherein the operations further comprise:
   parsing the cookie to identify an encrypted signed key; and
   searching the session key cache to identify the session key based at least in part on the encrypted signed key.

9. The one or more computer memories of claim 6, wherein the operations further comprise removing the session key from the session key cache based at least in part on a removal time schedule.

10. The one or more computer memories of claim 6, wherein the operations further comprise removing the session key from the session key cache based at least in part on a determination that a number of session keys in the session key cache exceeds a predetermined number of session keys.

11. A system comprising:
one or more processors; and
one or more memories storing instructions that, when executed by the one or more processors, configure the one or more or processors to perform operations comprising:
signing a session key using a private/public key pair to generate a signed key;
maintaining, in a session key cache, the session key in association with the signed key;
determining an expiration time for the session key;
receiving, at a time after the expiration time for the session key, a cookie generated using the session key, the cookie including at least encrypted cookie data, the signed key, and an encrypted authentication tag, the encrypted authentication tag including a message authentication code associated with the cookie data and the session key, and the encrypted authentication tag encrypted using the session key;
determining, based at least in part on the receiving the cookie generated using the session key, that the session key associated with the cookie has expired;
removing the invalid session key from the session key cache in response to determining that the session key associated with the cookie has expired;
determining that the cookie is invalid based at least in part on the determining that the session key associated with the cookie has expired; and
establishing a new client session that is not based on a previous client session associated with the cookie in response to determining that the session key associated with the cookie has expired.

12. The system of claim 11, wherein the operations further comprise:
parsing the cookie to identify a key identification; and
searching the session key cache to identify the session key based at least in part on the key identification.

13. The system of claim 11, wherein the operations further comprise removing the session key from the session key cache based at least in part on a removal time schedule.

14. The system of claim 11, wherein the operations further comprise removing the session key from the session key cache based at least in part on a determination that a number of session keys in the session key cache exceeds a predetermined number of session keys.

15. A system comprising:
a memory device; and
one or more processors in data communication with the memory device, the one or more processors configured to:
sign a session key using a private/public key pair to generate a signed key;
maintain, in a session key cache in the memory device, the session key in association with the signed key;
determine an expiration time for the session key;
receive, at a time after the expiration time for the session key, a cookie generated using the session key, the cookie including at least encrypted cookie data, the signed key, and an encrypted authentication tag, the encrypted authentication tag including a message authentication code associated with the cookie data and the session key, and the encrypted authentication tag encrypted using the session key;
determine, based at least in part on the receiving the cookie generated using the session key, that the session key associated with the cookie is invalid;
remove the invalid session key from the session key cache;
determine that the cookie is invalid based at least in part on the invalid session key; and
establish a new client session that is not based on a previous client session associated with the cookie.

16. The system of claim 15, wherein the one or more processors are further configured to:
parse the cookie to identify a key identification; and
search the session key cache to identify the session key based at least in part on the key identification.

17. The system of claim 15, wherein the one or more processors are further configured to remove the session key from the session key cache based at least in part on a removal time schedule.

18. The method of claim 1, wherein the cookie comprises at least a key identification associated with the private/public key pair.

19. The one or more computer memories of claim 6, wherein the operations further comprise:
decrypting, as decrypted cookie data, the encrypted cookie data using the session key; and
verifying a validity of the decrypted cookie data based at least in part on the message authentication code included in the encrypted authentication tag.

20. The system of claim 11, wherein the operations further comprise:
parsing the cookie to identify an encrypted session key;
searching an encrypted session key cache for the encrypted session key;
determining that the encrypted session key is not in the encrypted session key cache; and
identifying, based at least in part on determining that the encrypted session key is not in the encrypted session key cache, the public/private key pair based on a key identification included in the cookie.

21. The system of claim 15, wherein the one or more processors are further configured to generate an error message instructing the system not to accept the cookie.

* * * * *